May 19, 1953  J. W. KAYE  2,638,913

IN-LINE STEAM TRAP

Filed Feb. 20, 1948

INVENTOR.
J. W. KAYE
BY
Hugh S. Weitz
ATTORNEY

Patented May 19, 1953

2,638,913

UNITED STATES PATENT OFFICE 2,638,913

IN-LINE STEAM TRAP

James W. Kaye, Montclair, N. J., assignor to Kaye & MacDonald, Inc., West Orange, N. J., a corporation of New Jersey Application February 20, 1948, Serial No. 9,724

6 Claims. (Cl. 137—185)

This invention relates to steam traps and more specifically to in-line steam traps.

It is an object of this invention to provide an in-line steam trap for high pressure service. An "in-line" steam trap is one which has a side inlet and a side outlet.

There has long been a need in certain industries for an in-line steam trap for high pressure service in which it is possible to remove the valve and seat without breaking any pipe joints or removing the cover of the steam trap. The present invention provides an answer for this need.

It is another object of this invention to simplify the changing of valves and seats in certain types of steam traps.

It is a further object of this invention to greatly reduce the time required to replace the valves and seats in steam traps.

It is still another object of this invention to provide an in-line steam trap in which the valve and seat can be changed by the simple removal of two stud nuts and the loosening of a single screw.

Other objects and features will be apparent as the description proceeds.

In accordance with an illustrative embodiment of the invention, there is provided an in-line steam trap of the float type which can, for example, have a compound lever mechanism for operating the valve therein like that shown in the copending application of J. W. Kaye, Serial No. 791,295, filed December 12, 1947, although it is to be understood that other types of valve-operating mechanism can be used as well. The steam trap comprises a main casing, inlet and outlet blocks attached respectively to two opposite sides of the trap, an external valve assembly (valve body, valve guide, valve and seat), outlet cap, an inlet tube or pipe permanently connecting the inlet block to a bottom inlet block attached to the underside of the main casing, and an outlet tube connecting an opening in the outlet cap to the outlet block and which outlet tube becomes easily removable from the block when the outlet cap is taken off to change the valve or valve seat. The outlet tube passes through a packing gland which is used to hold in place stuffing in a stuffing box in the outlet block. The packing gland is held in place by a clamp surrounding the outlet block.

Figure 1:
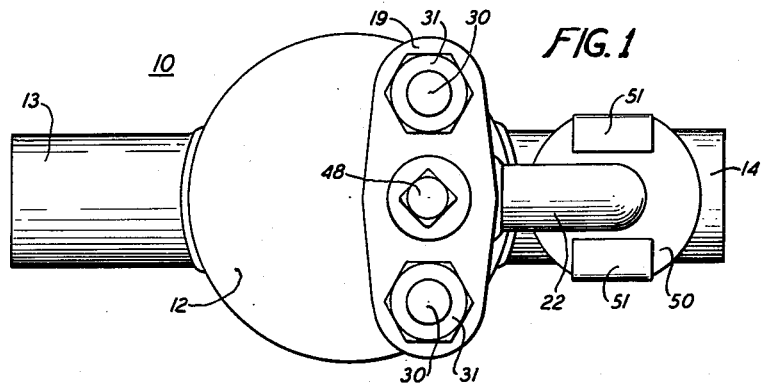
Figure 2:
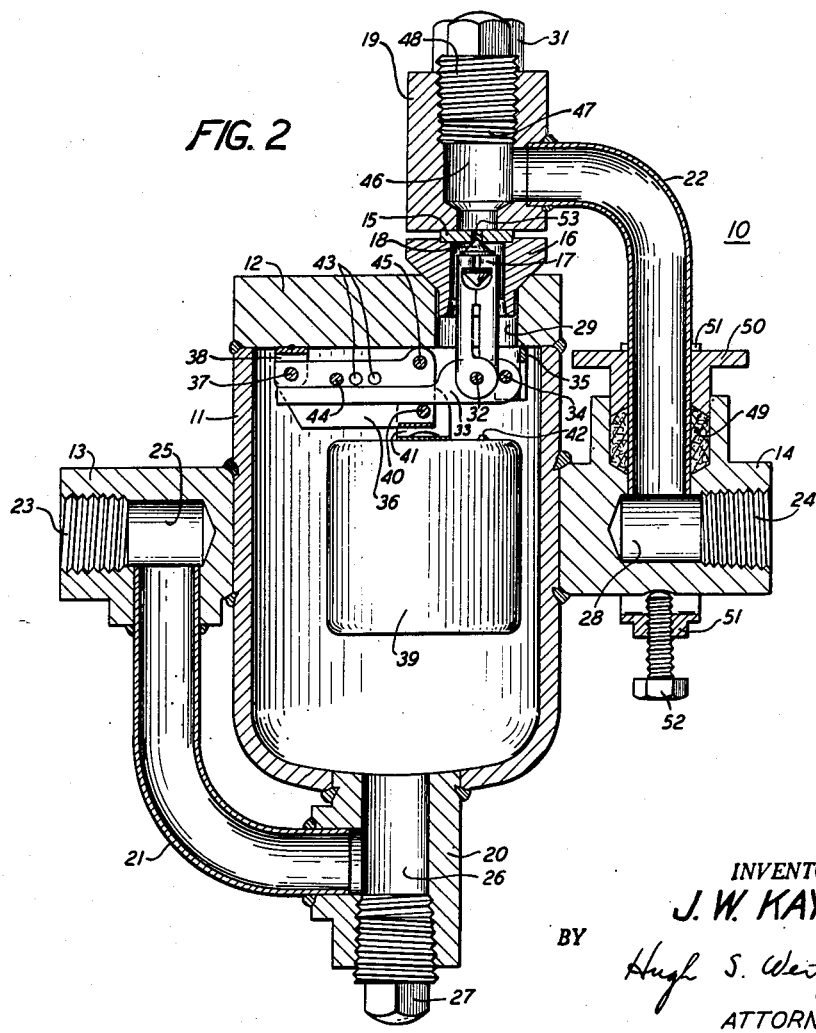

The invention will be more readily understood by referring to the following description taken in connection with the accompanying drawing forming a part thereof, in which:

Fig. 1 is a top view of an in-line steam trap in accordance with the invention; and Fig. 2 is an elevational cross-sectional view of the steam trap of Fig. 1.

Referring more specifically to the drawings, Figs. 1 and 2 show, by way of example for purposes of illustration, an in-line steam trap 10 in accordance with the invention. Briefly described, the steam trap 10 comprises a main casing 11 having a head or cover 12, a side inlet block 13 fastened to one side of the casing 11, a side outlet block 14 fastened to the other side of the casing, an external valve assembly comprising a valve seat 15, a valve body 16, a valve guide 17 and valve 18, an outlet cap 19, a bottom inlet block 20, a tube 21 for connecting the inlet block 13 and the bottom inlet block 20, and tube 22 for connecting the outlet cap 19 to the outlet block 14.

The cylindrical casing 11 is connected to the inlet and outlet side blocks 13 and 14, to the bottom inlet block 20 and to the head 12 by any suitable means, such as by welding, for example. Welds are indicated on the drawing. All of these parts are preferably of cast steel or iron.

The inlet and outlet side blocks 13 and 14 have tapped entrance and exit ports 23 and 24, respectively, which are connected in the steam line in which the trap 10 is to be used. The block 13 has a chamber 25 therein which is permanently connected to a chamber 26 in the bottom block 20 by the tube 21. The chamber 26 which communicates with the interior of the casing 11 can be cleaned from the bottom by removing the blow-off plug 27 in the bottom of the block 20. The block 14 has a chamber 28 which receives fluid from the tube 22.

The head 12 has an opening 29 therein within which is supported the valve body 16 recessed to receive the reversible valve seat 15. The body 16 is held against the cover 12 by the force of the outlet cap 19 being transmitted through the valve seat, the cap being held tightly against the valve seat by studs 30 and stud nuts 31. The valve guide 17 is connected by means of pivot pin 32 to the valve lever 33 which is pivoted around pin 34 in bracket 35 fixed to the cover 12. The valve lever 33 is actuated by the float lever 36. The lever 36 is pivoted at its upper end around pivot pin 37, held by a U-shaped bracket 38 which straddles the float lever 36 and is firmly affixed to the cover 12, and is connected at its lower end to the float 39 by means of pin 40 and U-shaped bracket 41. The float 39 is of any standard inverted bucket type and is provided with vent hole 42. The bracket 41 straddles lever 36 and is firmly attached to the float 39. The float lever 36 has a plurality of holes 43 in one of which is placed the removable pin 44. The upper right hand portion of the lever 36 has a pair of holes which receive a pin 45. For a more detailed description of the mechanism between the float 39 and the valve 18 and the method of operation thereof, reference is made to the above-identified Kaye application. It is to be understood that the present invention does not depend on the specific type of valve-operating mechanism just described.

The tube 22 forms a passageway between the chamber 46 in the block 19 and the chamber 28 in the outlet block 14. A tapped opening 47 in the top of the block 19 is plugged by plug 48. The tube 22 passes through a stuffing box 49 in the block 14, the stuffing therein being held in place by the packing gland 50. A clamp 51 surrounding block 14 and held by means of screw 52 pressing against the underside of the block 14 presses the packing in the box 49 and holds the gland 50 in place.

The operation of the steam trap 10 will now be described. The trap is placed in a vertical position as shown in Fig. 2 with the unit being drained piped to 23 and the threaded opening 24 in the outlet block 14 being piped to a return or drain. Under operating conditions, the casing 11 is completely filled with water. With no condensate entering the trap 10, the float 39 will be approximately two-thirds filled with steam and buoyed to the top-most position (shown in Fig. 2) with pin 40 bearing against the valve lever 33. The valve 18 is held against the valve seat 15 by the pressure within the casing 11. The vent 42 allows any air entering the float 39 to pass through the float and be discharged with the condensate. As condensate reaches the trap, the steam in the float 39 is displaced by the water until the float is no longer buoyant and begins to sink. As the float 39 drops, it remains vertical as it pivots around the pin 40 and pulls float lever 36 down, the latter being pivoted at the pin 37. This causes the pin 44 through one of the pairs of holes 43 to come into contact with the valve lever 33 and forces this lever downward, it being pivoted around pin 34. As the valve lever is forced downward at the pin 44, the valve 18 is pulled away from its seat 15 until the force of the pressure holding the valve shut is overcome and the valve opens. As pointed out in the above-identified Kaye application, as the float descends the already tremendous mechanical advantage increases, for as pin 44 describes an arc about the pivot 37, the line of contact between the pin 44 and the lever 33 moves away from the pivot 34, exerting more force downwardly on the lever 33 and in turn on the valve 18.

After the valve 18 has been opened sufficiently to overcome the force of the pressure within the casing 11, the weight of the valve lever 33 alone pulls the valve 18 wide open and the great mechanical advantage initially utilized to pull the valve 18 off the seat 15 is no longer necessary. It is for this reason that pin 45 is so positioned on the float lever 36 that it makes contact with valve lever 33 shortly after the valve 18 has left the seat 15. Thus, as the float 39 descends, the pin 45 moves downwardly at a faster rate than the pin 44, pulling the valve 18 far away from its seat 15, thereby providing a free and clean orifice 53 for the passage of condensate. In addition to providing a wide open valve, pin 45 eliminates the possibility of the valve 18 fluctuating or fluttering on or off its seat 15 due to the velocity of the water rushing past it. Once the float 39 begins to fall, discharge of condensate is positive and continuous until the float rises. The condensate passes through chamber 46, tube 22 and chamber 28 and thence to port 24.

When no condensate is coming to the trap 10, steam enters the casing 11 via the chamber 26. It enters the float 39, displacing the water inside it, and the float becomes buoyant and begins to rise. As the float 39 rises, pin 40 bears against lever 33 and moves the valve 18 into the closing position (Fig. 2), holding the valve 18 tightly against its seat 15. Although a very high mechanical advantage is employed to open the valve 18 against the high pressure within the casing 11, very little leverage is employed in closing the valve.

The three pairs of holes 43 provided in the valve lever 33 to receive pin 44 make it possible to handle a greater number of operating conditions with one valve size by moving pin 44 to the most suitable pair of holes 43.

For a more detailed description of the reversible valve 18 and valve seat 15 assembly briefly described above, reference is made to Patent 1,960,999, issued May 29, 1934, to J. W. Kaye.

Removal of valve 18 and seat 15 can be effected without removing the trap 10 from the line or breaking any pipe joints. To remove the members 18 and 15, all that is necessary is to remove the two stud nuts 31, loosen the packing gland clamp screw 52 to remove the clamp 51, and then remove the cap 19 taking the tube 22, which is attached to it, with it. The orifice 53 in the valve seat 15 can be cleaned by removing the plug 48 and using a pick or cleaning tool. The port 47 can be used also as a test outlet.

Various modifications can be made in the embodiment described above without departing from the spirit of the invention, the scope of which is indicated by the claims.

What is claimed is:

1. An in-line steam trap comprising a main casing, inlet and outlet blocks on opposite sides of said casing, each of said blocks having a port for connection to a pipe line having fluid flow therein, means for connecting said port in said inlet block to the interior of said casing, a head for said casing having an opening therein, a valve holder positioned within said opening and extending above it, a valve seat having a port therein and being positioned above said valve holder, a valve carried by the valve holder and adapted by an upward movement to close the port in the valve seat, a float within said casing, lever mechanism between the float and valve for operating said valve, a cap positioned above said valve seat and fastened to said casing head thereby holding said seat in position, said cap having a chamber therein having an inlet port adjacent said valve seat and an outlet port, means for connecting said outlet port in said cap to said port in said outlet block, said last-mentioned means comprising a tube outside of both said main casing and said head and which is readily removable from said outlet block, and a stuffing box surrounding a portion of said last-mentioned means in said outlet block.

2. An in-line steam trap comprising a main casing, inlet and outlet blocks on opposite sides of said casing, each of said blocks having a port for connection to a pipe line having fluid flow therein, means for connecting said port in said inlet block to the interior of said casing, a head for said casing having an opening therein, a valve holder positioned within said opening and extending above it, a valve seat having a port therein and being positioned above said valve holder, a valve carried by the valve holder and adapted by an upward movement to close the port in the valve seat, a float within said casing, lever mechanism between the float and valve for operating said valve, a cap positioned above said valve seat and fastened to said casing head thereby holding said seat in position, said cap having a chamber therein having an inlet port adjacent said valve seat and an outlet port, means for connecting said outlet port in said cap to said port in said outlet block, said last-mentioned means comprising a tube outside of both said main casing and said head and which is readily removable from said outlet block, a stuffing box surrounding a portion of said last-mentioned means in said outlet block, and a gland for holding the stuffing in said stuffing box in position.

3. An in-line steam trap comprising a main casing, inlet and outlet blocks on opposite sides of said casing, each of said blocks having a port for connection to a pipe line having fluid flow therein, means for connecting said port in said inlet block to the interior of said casing, a head for said casing having an opening therein, a valve holder positioned within said opening and extending above it, a valve seat having a port therein and being positioned above said valve holder, a valve carried by the valve holder and adapted by an upward movement to close the port in the valve seat, a float within said casing, lever mechanism between the float and valve for operating said valve, a cap positioned above said valve seat and fastened to said casing head thereby holding said seat in position, said cap having a chamber therein having an inlet port adjacent said valve seat and an outlet port, means for connecting said outlet port in said cap to said port in said outlet block, said last-mentioned means comprising a tube outside of both said main casing and said head and which is readily removable from said outlet block, a stuffing box surrounding a portion of said last-mentioned means in said outlet block, a gland for holding the stuffing in said stuffing box in position, and a clamp around said outlet block for pressing said gland against said stuffing.

4. An in-line steam trap comprising a main casing, inlet and outlet blocks on opposite sides of said casing, each of said blocks having a port for connection to a pipe line having fluid flow therein, means for connecting said port in said inlet block to the interior of said casing, said means comprising a bottom block connected to the lower portion of the casing, a chamber in said bottom block opening into the interior of said casing and a tube connecting the port in the inlet block to said chamber in the bottom block, a head for said casing having an opening therein, a valve holder positioned within said opening and extending above it, a valve seat having a port therein and being positioned above said valve holder, a valve carried by the valve holder and adapted by an upward movement to close the port in the valve seat, a float within said casing, a lever mechanism between the float and valve for operating said valve, a cap positioned above said valve seat and fastened to said casing head thereby holding said seat in position, said cap having a chamber therein having an inlet port adjacent said valve seat and an outlet port, and means for connecting said outlet port in said cap to said port in said outlet block.

5. An in-line steam trap comprising a main casing, inlet and outlet blocks on opposite sides of said casing, each of said blocks having a port for connection to a pipe line having fluid flow therein, means for connecting said port in said inlet block to the interior of said casing, said means comprising a bottom block connected to the lower portion of the casing, a chamber in said bottom block opening into the interior of said casing and a tube connecting the port in the inlet block to said chamber in the bottom block, said bottom block having a blow-off port in the under side thereof connected to the chamber therein and a plug for said blow-off port, a head for said casing having an opening therein, a valve holder positioned within said opening and extending above it, a valve seat having a port therein and being positioned above said valve holder, a valve carried by the valve holder and adapted by an upward movement to close the port in the valve seat, a float within said casing, lever mechanism between the float and valve for operating said valve, a cap positioned above said valve seat and fastened to said casing head thereby holding said seat in position, said cap having a chamber therein having an inlet port adjacent said valve seat and an outlet port, and means for connecting said outlet port in said cap to said port in said outlet block.

6. An in-line steam trap comprising a main casing, inlet and outlet blocks on opposite sides of said casing, each of said blocks having a port for connection to a pipe line having fluid flow therein, means for connecting said port in said inlet block to the interior of said casing, said means comprising a bottom block connected to the lower portion of the casing, a chamber in said bottom block opening into the interior of said casing and a tube connecting the port in the inlet block to said chamber in the bottom block, a head for said casing having an opening therein, a valve holder positioned within said opening and extending above it, a valve seat having a port therein and being positioned above said valve holder, a valve carried by the valve holder and adapted by an upward movement to close the port in the valve seat, a float within said casing, lever mechanism between the float and valve for operating said valve, a cap positioned above said valve seat and fastened to said casing head thereby holding said seat in position, said cap having a chamber therein having an inlet port adjacent said valve seat and an outlet port, and means for connecting said outlet port in said cap to said port in said outlet block, said last-mentioned means comprising a tube outside of both said main casing and said head and which is readily removable from said outlet block.

JAMES W. KAYE.

References Cited in the file of this patent

UNITED STATES PATENTS

| Number | Name | Date |
|---|---|---|
| 690,658 | McAuley | Jan. 7, 1902 |
| 740,435 | Humphrey | Oct. 6, 1903 |
| 992,453 | Silliman | May 16, 1911 |
| 1,060,471 | Marquardt | Apr. 29, 1913 |
| 1,782,873 | Gurney | Nov. 25, 1930 |
| 1,901,200 | Strong | Mar. 14, 1933 |
| 1,960,999 | Kaye | May 29, 1934 |
| 1,966,007 | Flood | July 10, 1934 |

FOREIGN PATENTS

| Number | Country | Date |
|---|---|---|
| 295,663 | Great Britain | of 1928 |